United States Patent
Dorrer et al.

(10) Patent No.: US 7,321,454 B2
(45) Date of Patent: Jan. 22, 2008

(54) APPARATUS FOR MODULATING ONE OR BOTH OF SPECTRAL PHASE AND AMPLITUDE OF AN OPTICAL SIGNAL

(75) Inventors: Christophe J. Dorrer, Matawan, NJ (US); Dan M. Marom, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/245,760

(22) Filed: Oct. 7, 2005

(65) Prior Publication Data

US 2007/0081223 A1 Apr. 12, 2007

(51) Int. Cl.
*G02B 26/00* (2006.01)

(52) U.S. Cl. ...................................... 359/238; 359/290

(58) Field of Classification Search ................ 359/220, 359/222, 223, 238, 320, 322, 290, 291, 292, 359/279

See application file for complete search history.

(56) References Cited

U.S. PATENT DOCUMENTS

| | | | |
|---|---|---|---|
| 4,655,547 A | 4/1987 | Heritage et al. | |
| 4,954,789 A | 9/1990 | Sampsell | |
| 5,256,869 A | 10/1993 | Lin et al. | |
| 6,512,625 B2 * | 1/2003 | Mei et al. | 359/290 |
| 6,631,145 B1 | 10/2003 | Tamura et al. | |
| 6,842,549 B2 * | 1/2005 | So | 385/15 |
| 6,879,426 B1 * | 4/2005 | Weiner | 359/279 |
| 6,965,470 B2 * | 11/2005 | So | 359/341.41 |

FOREIGN PATENT DOCUMENTS

EP  0 477 566 A2  4/1992
WO  WO 00/77955 A2  12/2000

OTHER PUBLICATIONS

D. M. Marom, C. Dorrer, I. Kang, C. R. Doerr, M. Cappuzzo, L. Gomez, E. Chen, A. Wong-Foy, E. Laskowski, F. Klemens, C. Bolle, R. Cirelli, E. Ferry, T. Sorsch, J. Miner, E. Bower, M. E. Simon, F. Pardo, and D. Lopez Compact spectral pulse shaping using hybrid planar lightwave circuit and free-space optics with MEMS piston micro-mirrors and spectrogram feedback control, IEEE Lasers and Electro-Optics Society 2004 Annual Meeting, Puerto Rico, Nov. 2004. (2004).

International Search Report in corresponding PCT/US2006/039161, Feb. 12, 2007, Lucent Technologies Inc.

* cited by examiner

*Primary Examiner*—Ricky Mack
*Assistant Examiner*—Tuyen Tra

(57) ABSTRACT

The invention includes a method and apparatus for modulating one or both of spectral phase and amplitude of a received optical signal. The apparatus includes a spatial dispersion mechanism for spatially dispersing the received optical signal to enable optical communication of the received optical signal to an array of modulators. The apparatus includes a modulating mechanism having a first modulating component and a second modulating component. A first portion of the spatially dispersed optical signal is incident on the first modulating component and a second portion of the spatially dispersed optical signal is incident on the second modulating portion. The apparatus further includes a controller coupled to the modulating mechanism. The controller is adapted for moving the first and second modulating components in a direction normal to their planes for modulating one or both of phase and amplitude of the received optical signal.

19 Claims, 7 Drawing Sheets

US 7,321,454 B2

APPARATUS FOR MODULATING ONE OR BOTH OF SPECTRAL PHASE AND AMPLITUDE OF AN OPTICAL SIGNAL

FIELD OF THE INVENTION

The invention relates to the field of communication networks and, more specifically, to the modulation of optical signals.

BACKGROUND OF THE INVENTION

In general, various optics fields require control of spectral phase and spectral amplitude of an optical signal. The control may be achieved by spatially dispersing and modulating spectral components of the optical signal. The spatial dispersion of the optical signal is typically accomplished using a spatial dispersion arrangement, such as a lens-grating combination. The modulation of the optical signal is typically accomplished using a spatial light modulator. Disadvantageously, existing spatial light modulators cannot support both phase modulation mode and amplitude modulation mode; rather, existing spatial light modulators operate in one of either a phase modulation mode or an amplitude modulation mode. Thus, existing spatial light modulation systems utilize two spatial light modulators in series in order to control both spectral phase and spectral amplitude of an optical signal.

Furthermore, prevalent spatial light modulation technology is based on liquid-crystal modulators, requiring polarization of the input optical signal in an appropriate state. Unfortunately, such limitations have restricted application of spectral phase and amplitude modulation to laboratory experiments in which a required polarization state is easily controlled, and associated cost and losses of cascading two spatial light modulators in series becomes tolerable. As such, existing spatial light modulation systems are inefficient, difficult to control, and, therefore, expensive.

SUMMARY OF THE INVENTION

Various deficiencies in the prior art are addressed through the invention of a method and apparatus for modulating one or both of spectral phase and amplitude of a received optical signal. The apparatus includes a spatial dispersion mechanism for spatially dispersing the received optical signal to enable optical communication of the received optical signal onto an array of modulators. In one embodiment, the array of modulators includes a first linear array of modulating components and a second linear array of modulating components. A first portion of the spatially dispersed optical signal is incident on the first linear array of modulating components and a second portion of the spatially dispersed optical signal is incident on the second linear array of modulating components. The apparatus further includes a controller coupled to the modulating mechanism. The controller is adapted for moving the first and second linear arrays of modulating components in a direction normal to their planes for modulating the phases of the first and second portions of the spatially dispersed optical signal. A spatial filtering mechanism modulates one or both of spectral phase and amplitude of the received optical signal by spatially filtering the phase-modulated portions of the spatially dispersed optical signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is discussed in the context of an optical signal processing system; however, the present invention can be readily applied to other optical systems. In general, the present invention includes an apparatus and method for modulating one or both of phase and amplitude using a single spatial light modulator. In accordance with the present invention, adjacent pairs of modulating components in an array of modulating components are controllably moveable in a direction normal to the respective planes of the modulating components for modulating one or both of phase and amplitude. In accordance with the present invention, the single spatial light modulator is polarization insensitive.

Figure 1:
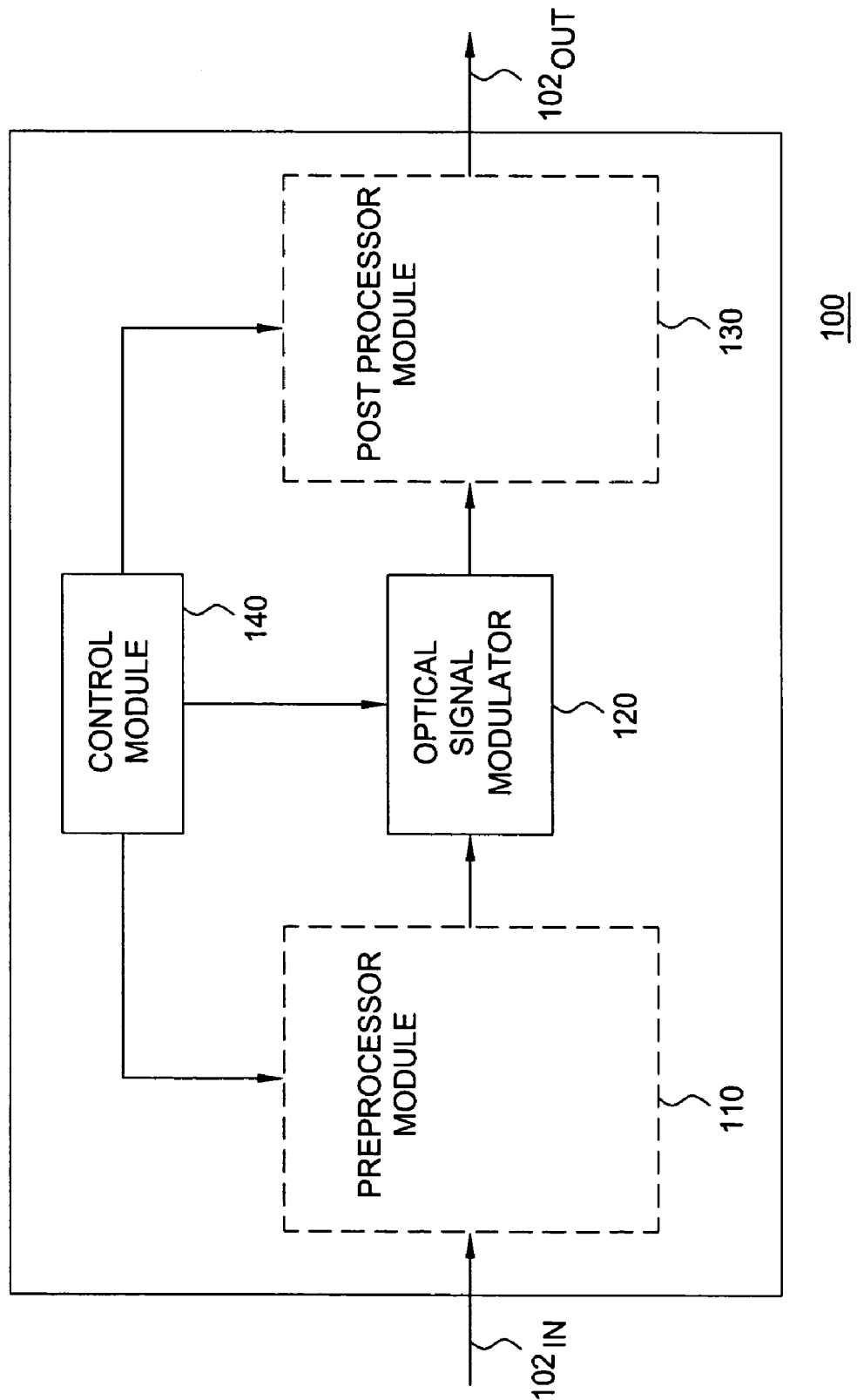
FIG. 1 depicts a high-level block diagram of an optical signal processing system.

FIG. 1 depicts a high-level block diagram of an optical signal processing system. As depicted in FIG. 1, optical signal processing system 100 includes an optional preprocessor module (PM) 110, an optical spectral modulator (OSM) 120, an optional postprocessor module (PM) 130, and a control module (CM) 140. As depicted in FIG. 1, CM 140 communicates with each of PM 110, OSM 120, and PM 130. As depicted in FIG. 1, CM 140 receives and executes commands adapted for controlling PM 110, OSM 120, and PM 130. Similarly, as depicted in FIG. 1, CM 140 generates and communicates commands adapted for controlling PM 110, OSM 120, and PM 130.

As depicted in FIG. 1, PM 110 receives optical signals from an optical input fiber $102_{IN}$. The PM 110 performs preprocessing of the received optical signals. The PM 110 sends the preprocessed optical signals to OSM 120. As depicted in FIG. 1, OSM 120 receives preprocessed optical signals from PM 110. The OSM 120 performs spectral phase and/or amplitude modulation. The OSM 120 sends the modulated optical signals to PM 130. As depicted in FIG. 1, PM 130 receives the modulated optical signals from OSM 120. The PM 130 performs post-processing on the modulated optical signals. The PM 130 directs optical signals towards a downstream network element (not depicted) via an optical output fiber $102_{OUT}$.

As depicted in FIG. 1, PM 110 is operable for performing various optical signal pre-processing functions. For example, PM 110 may include optical characterization modules, optical power monitoring modules, optical amplifiers, dispersion compensation modules, and like optical signal pre-processing modules. As depicted in FIG. 1, PM 130 is operable for performing various optical signal post-processing functions. For example, PM 130 may include optical amplifiers, optical characterization modules, and like optical signal post-processing modules. Although described with respect to specific functions, those skilled in the art will appreciate that PM 110 and PM 130 may perform various other optical signal processing functions.

Although depicted and described with respect to specific functional components of an optical signal processing system, the present invention is not intended to be limited to a specific optical signal processing system configuration. As such, although depicted and described within the context of a particular optical signal processing system, the present invention may be used in various other optical signal processing systems. Furthermore, although explicitly depicted and described with respect to FIG. 1, those skilled in the art will appreciate that spatial light modulators may be used in different components of the optical signal processing system depicted and described with respect to FIG. 1. For example, a spatial light modulator in accordance with the present invention may be used in optical wavelength selective switches, optical channel blockers, and like optical signal processing modules and systems.

Figure 2:
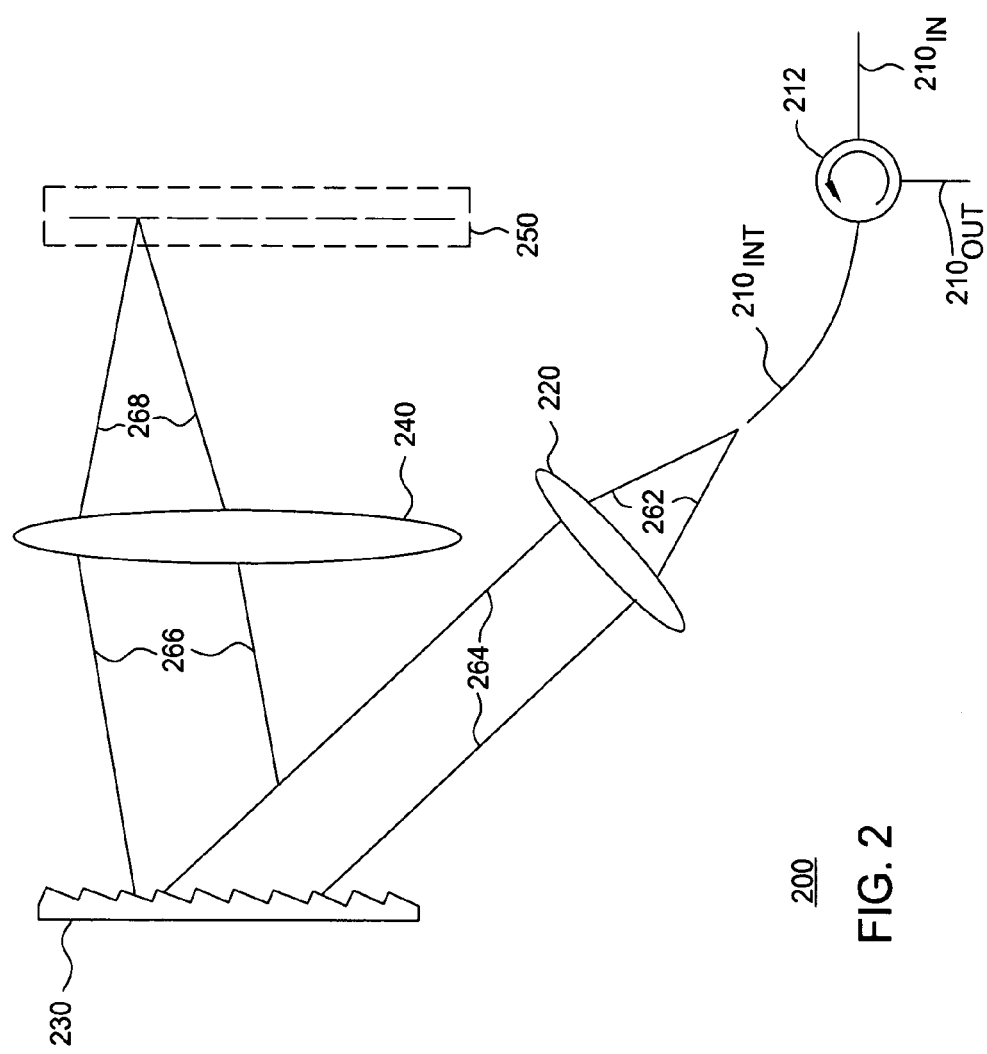
FIG. 2 depicts a high-level block diagram of a spatial light modulation system including a spatial light modulator, in which the spatial light modulation system spatially disperses a received optical signal such that a spatially dispersed optical signal is incident on the spatial light modulator.
Figure 3:
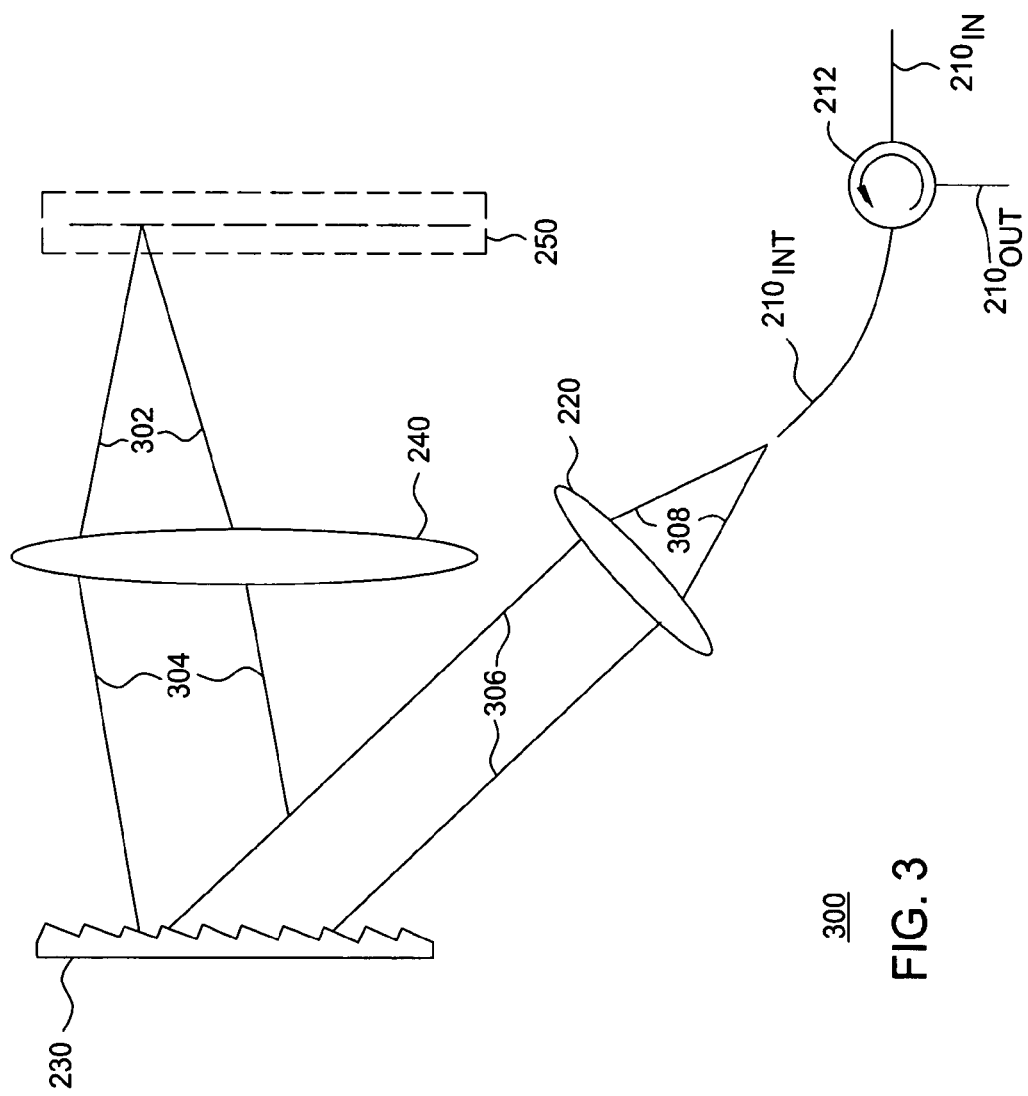
FIG. 3 depicts a high-level block diagram of the spatial light modulation system of FIG. 2 including the spatial light modulator of FIG. 2, in which the spatial light modulation system propagates the modulated optical signal from the spatial light modulator for coupling into an output optical fiber.

A spatial light modulation system is depicted and described herein with respect to FIG. 2 and FIG. 3. The spatial light modulation system spatially disperses the received optical signal such that a spatially dispersed optical signal is incident on the spatial light modulator for modulating the spectral phase and spectral amplitude of the optical signal. The spatial light modulation system propagates the modulated optical signal from the spatial light modulator for coupling into an optical output fiber. In particular, propagation of a received optical signal from an optical input fiber to the spatial light modulator is depicted and described herein with respect to FIG. 2, and propagation of a modulated optical signal from the spatial light modulator to an optical output fiber is depicted and described with respect to FIG. 3. A spatial light modulator according to one embodiment of the present invention is depicted and described with respect to FIG. 4.

FIG. 2 depicts a high-level block diagram of a spatial light modulation system including a spatial light modulator. Specifically, spatial light modulation system 200 of FIG. 2 includes an optical input fiber $210_{IN}$, an optical output fiber $210_{OUT}$, an optical interface fiber $210_{INT}$, an optical circulator 212, a first lens 220, a diffraction grating 230, a second lens 240, and a spatial light modulator 250. The operation of optical input fiber $210_{IN}$, optical output fiber $210_{OUT}$, optical interface fiber $210_{INT}$, optical circulator 212, first lens 220, diffraction grating 230, and second lens 240 in the direction of propagation from optical input fiber $210_{IN}$ towards spatial light modulator 250 is described herein with respect to FIG. 2.

As depicted in FIG. 2, optical input fiber $210_{IN}$ is coupled to optical circulator 212. The optical input fiber $210_{IN}$ is adapted for transporting optical input signals. The optical input fiber $21_{IN}$ transports optical input signals to optical circulator 212. As depicted in FIG. 2, optical circulator 212 directs received optical input signals from the optical input fiber $210_{IN}$ to the optical interface fiber $210_{INT}$. As depicted in FIG. 2, optical output fiber $210_{OUT}$ is coupled to optical circulator 212. The optical output fiber $210_{OUT}$ is adapted for transporting optical output signals. In one embodiment, optical output fiber $210_{OUT}$ is adapted for transporting modulated optical output signals. The optical output fiber $210_{OUT}$ receives optical output signals from optical circulator 212.

As depicted in FIG. 2, a first end of optical interface fiber $210_{INT}$ is coupled to optical circulator 212 and a second end of optical interface fiber $210_{INT}$ is uncoupled. The uncoupled end of optical interface fiber $210_{INT}$ is directed towards first lens 220. The optical interface fiber $210_{INT}$ is adapted for radiating optical input signals received from optical input fiber $210_{IN}$ via optical circulator 212 towards first lens 220. The optical input signal from optical circulator 212 radiates out from the tip of the uncoupled end of optical interface fiber $210_{INT}$ towards first lens 220 to form a radiated, received optical signal 262. As depicted in FIG. 2, first lens 220 collimates the radiated, received optical signal 262 to form a collimated, received optical signal 264. The collimated, received optical signal 264 is incident on diffraction grating 230.

As depicted in FIG. 2, diffraction grating 230 angularly disperses the collimated, received optical signal 264 to form a diffracted, received optical signal 266. The diffracted, received optical signal 266 from diffraction grating 230 is incident on second lens 240. The second lens 240 focuses the diffracted, received optical signal 266 to form a dispersed, received optical signal 268. The dispersed, received optical signal 268 from second lens 240 is incident on spatial light modulator 250. For purposes of clarity, a single frequency component (illustratively, optical signal 430 of FIG. 4) of the diffracted, received optical signal 266 is depicted and described herein. As such, it should be noted that, although not depicted, diffracted, received optical signal 266 and associated dispersed, received optical signal 268 comprise multiple frequency components, thereby forming a continuous signal spectrum (illustratively, spatially dispersed optical signal 420 depicted and described herein with respect to FIG. 4).

FIG. 3 depicts a high-level block diagram of the spatial light modulation system, including the spatial light modulator, of FIG. 2. The propagation of a received optical signal from an optical input fiber (illustratively, optical input fiber $210_{IN}$) to a spatial light modulator (illustratively, spatial light modulator 250) is depicted and described herein with respect to FIG. 2. The propagation of a modulated optical signal from the spatial light modulator (illustratively, spatial light modulator 250) to an optical output fiber (illustratively, optical output fiber $210_{OUT}$) is depicted and described with respect to FIG. 3. In particular, as depicted in FIG. 3, spatial light modulation system 200 directs the modulated optical signal from spatial light modulator 250 for coupling into optical output fiber $210_{OUT}$.

As depicted in FIG. 3, spatial light modulator 250 modulates the focused, received optical signal 268 of FIG. 2 to form a modulated optical signal 302. The spatial light modulator 250 reflects the modulated optical signal 302 towards second lens 240. The second lens 240 collimates modulated optical signal 302 to produce collimated, modulated optical signal 304. The second lens 240 collimates the modulated optical signal 302 for propagation towards diffraction grating 230. The collimated, modulated optical signal 304 from second lens 240 is incident on diffraction grating 230. The diffraction grating 230 angularly disperses the collimated, modulated optical signal 304 from second lens 240 to form a diffracted, modulated optical signal 306.

As depicted in FIG. 3, the diffracted, modulated optical signal 306 produced by diffraction grating 230 is incident on first lens 220. The diffracted, modulated optical signal 306 includes all spectral components co-propagating towards first lens 220. The first lens 220 focuses the diffracted, modulated optical signal 306 to produce a focused, modulated optical signal 308. The focused, modulated optical signal 308 is is incident on the tip of the uncoupled end of optical interface fiber $210_{INT}$ and couples into optical interface fiber $210_{INT}$. The modulated optical signal coupled into optical interface fiber $210_{INT}$ propagates through optical circulator 212. The optical circulator 212 directs the modulated optical signal (illustratively, in a counter-clockwise motion) to optical output fiber $210_{OUT}$.

Figure 4:
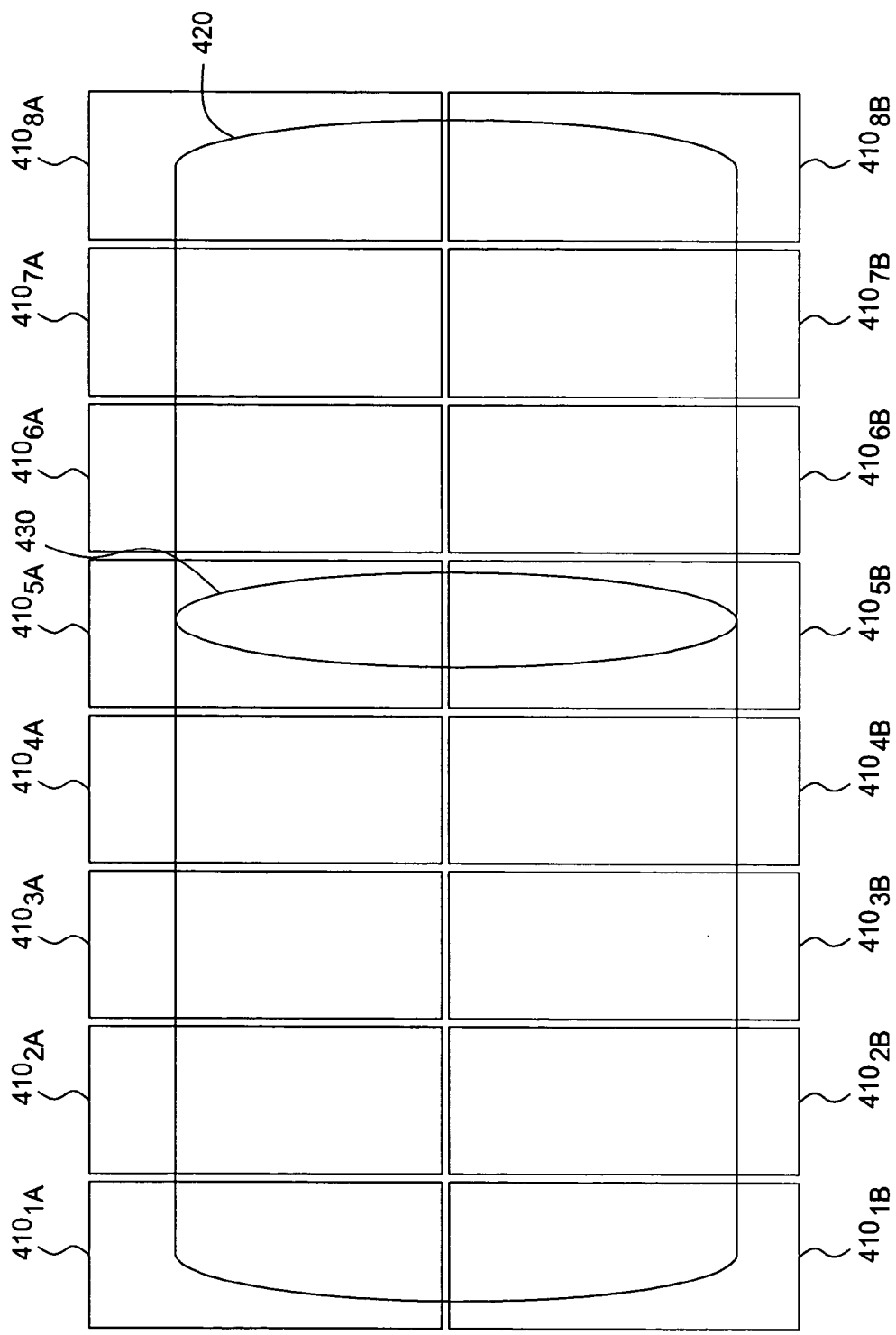
FIG. 4 depicts an incident view of a plurality of modulating component arrays of a spatial light modulator according to one embodiment of the invention.

FIG. 4 depicts an incident view of a plurality of modulating component arrays of a spatial light modulator according to one embodiment of the invention. Specifically, spatial light modulator 400 of FIG. 4 comprises a plurality of modulating component pairs $410_1$-$410_8$ (collectively, modulating component pairs 410). The first modulating components $410_{1A}$-$410_{8A}$ of modulating component pairs $410_1$-$410_8$ form a first modulating component array $410_A$. The second modulating components $410_{1B}$-$410_{8B}$ of modulating component pairs $410_1$-$410_8$ form a second modulating component array $410_B$. Although depicted as comprising eight modulating component pairs, spatial light modulator 400 may include more or fewer modulating component pairs.

As depicted in FIG. 4, modulating component pairs $410_1$-$410_8$ include modulating components $410_{1A}$ and $410_{1B}$, $410_{2A}$ and $410_{2B}$, $410_{3A}$ and $410_{3B}$, $410_{4A}$ and $410_{4B}$, $410_{5A}$ and $410_{5B}$, $410_{6A}$ and $410_{6B}$, $410_{7A}$ and $410_{7B}$, and $410_{8A}$ and $410_{8B}$, respectively. The first modulating component $410_{XA}$ and second modulating component $410_{XB}$ of each modulating component pair 410 are adjacent in a direction normal to the dispersion direction a spatially dispersed optical signal (illustratively, normal to the dispersion direction of spatially dispersed optical signal 420). As depicted in FIG. 4, first and second modulating component arrays $410_A$ and $410_B$ are one-dimensional arrays. Although depicted and described as one-dimensional arrays, in one embodiment, modulating component arrays $410_A$ and $410_B$ may be implemented as multi-dimensional modulating component arrays.

As depicted in FIG. 4, a spatially dispersed optical signal 420 is incident upon spatial light modulator 400 such that the dispersed optical spectrum is stretched across each of modulating component pairs 410. The spatially dispersed optical signal 420 is incident upon spatial light modulator 400 such that a first half (e.g., top half) of spatially dispersed optical signal 420 is incident upon modulating components $410_{A1}$-$410_{A8}$ of first modulating component array $410_A$ and a second half (e.g., bottom half of spatially dispersed optical signal 420 is incident upon modulating components $410_{B1}$-$410_{B8}$ of second modulating component array $410_B$.

As depicted in FIG. 4, a single-frequency optical signal 430 of spatially dispersed optical signal 420 is incident upon spatial light modulator 400 such that the single-frequency optical signal 430 is incident upon one of the modulating component pairs 410 (illustratively, modulating component pair $410_5$). Although one single-frequency optical signal 430 of spatially dispersed optical signal 420 is depicted, various other single-frequency optical signals (not depicted) of spatially dispersed optical signal 420 may be incident on others of the modulating component pairs 410.

As described herein, each modulating component pair is controllably moveable for performing phase modulation and amplitude modulation. In particular, the first modulating component and second modulating component of each modulating component pair are adjustable for modulating phase and amplitude of single-frequency components of optical signal incident upon spatial light modulator 400. In one embodiment, phase modulation and amplitude modulation is performed by controllably moving the modulating components of a modulating component pair. In one embodiment, modulating components of a modulating component pair are moved in a direction normal to their respective planes (i.e., using a piston motion for moving toward or away from the incident optical signal).

In one embodiment, as described herein, phase modulation is achieved by moving a first modulating component and a second modulating component an equal distance such that the separation between the first and second modulating components is constant (i.e., the separation between the planes of the reflective surfaces of the first and second modulating components is constant). For example, the spectral phase of a single-frequency component of a spatially dispersed optical signal incident on spatial light modulator 400 may be changed from phase=0 to phase=$\pi$ (where amplitude=1) by moving the first and second modulating components to encode phase from phase settings $\phi_1$=0 and $\phi_2$=0, respectively, to $\phi_1$=$\pi$ and $\phi_2$=$\pi$, respectively. In other words, the first and second modulating components move an equal distance in the same direction such that, over the course of the movement, separation between the first and second modulating components remains substantially constant (i.e., separation=0).

In one embodiment, as described herein, amplitude modulation is achieved by moving a first modulating component and a second modulating component such that the separation between the first and second modulating components is variable (i.e., the separation between the planes of the reflective surfaces of the first and second modulating components is changing during the movement). For example, the spectral amplitude of a single-frequency component of a spatially dispersed optical signal incident on spatial light modulator 400 may be changed from amplitude=1 to amplitude=0.5 (where phase remains constant at phase=$\pi$) by actuating the associated first modulating component and second modulating component from phase settings $\phi_1$=$\pi$ and $\phi_2$=$\pi$, respectively, to $\phi_1$=$4\pi/3$ and $\phi_2$=$2\pi/3$, respectively. In other words, the first and second modulating components move an equal distance ($\pi/3$) in the opposite directions such that, over the course of the movement, the separation between the first and second modulating components changes from separation=0 to separation=$2\pi/3$.

As described herein, spectral phase and/or spectral amplitude of a single-frequency optical signal 430 of spatially dispersed optical signal 420 may be modulated by actuating first modulating component $410_{A4}$ and second modulating component $410_{B4}$ of modulating component pair $410_4$ to various combinations of phase settings. For example, assuming that modulating component pair $410_4$ is configured such that phase=0 and amplitude=1, first modulating component $410_{A4}$ and second modulating component $410_{B4}$ have phase settings of $\phi_1=0$ and $\phi_2=0$, respectively. In continuation of this example, modulation of the spectral phase and spectral amplitude of single-frequency optical signal 430 such that phase=$\pi$ and amplitude=0.5 is achieved by actuating the first modulating component $410_{A4}$ and second modulating component $410_{B4}$ from initial phase settings of $\phi_1=0$ and $\phi_2=0$, respectively, to phase settings of $\phi_1=4\pi/3$ and $\phi_2=2\pi/3$, respectively. As such, the present invention enables spectral phase and spectral amplitude modulation using phase-only modulating component actuation.

Figure 5:
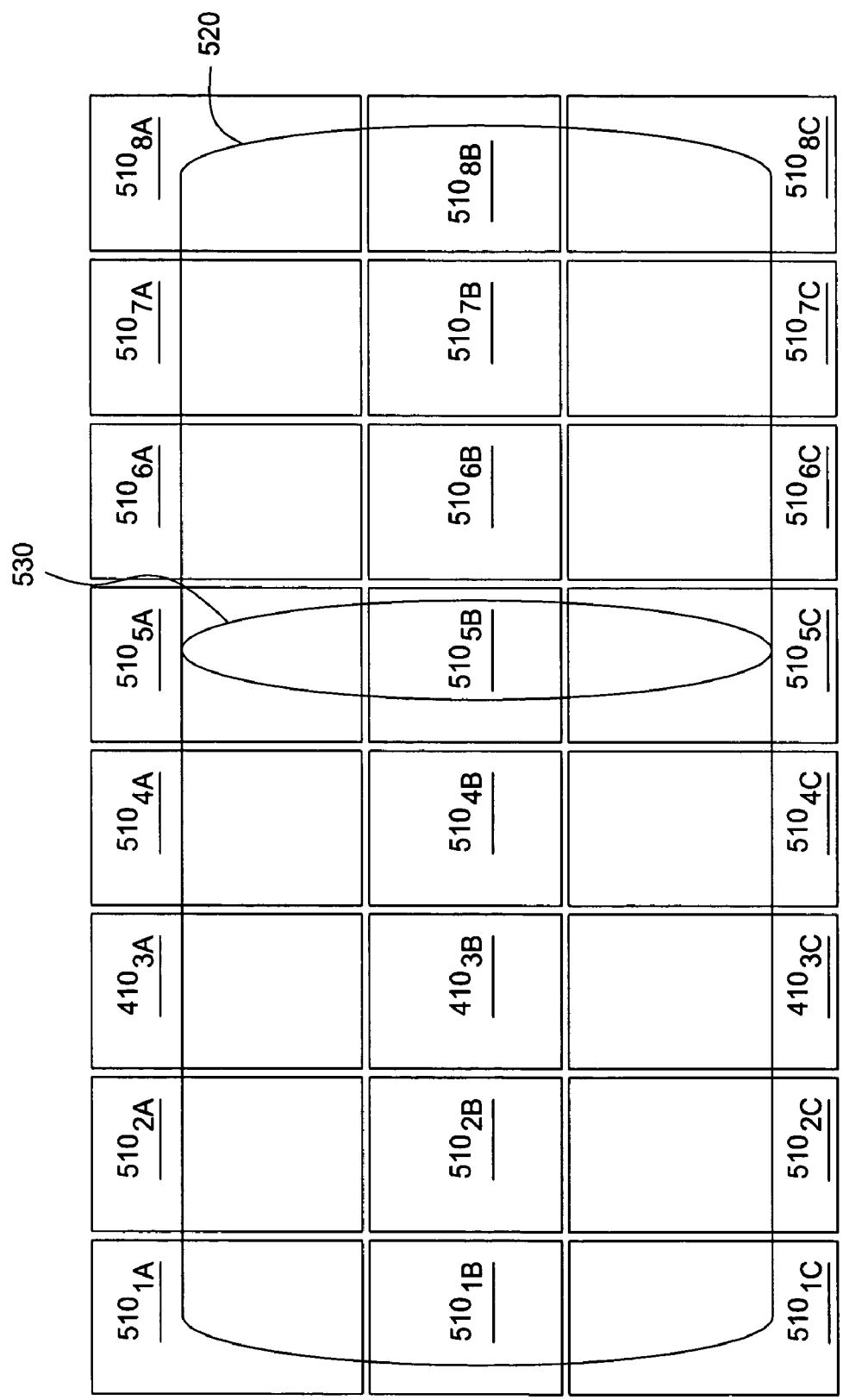
FIG. 5 depicts an incident view of a plurality of modulating component arrays of a spatial light modulator according to one embodiment of the invention.

FIG. 5 depicts an incident view of a plurality of modulating component arrays of a spatial light modulator according to one embodiment of the invention. Specifically, spatial light modulator 500 of FIG. 5 comprises a plurality of modulating component sets $510_1$-$510_8$ (collectively, modulating component sets 510). The first modulating components $510_{1A}$-$510_{8A}$ of modulating component sets $510_1$-$510_8$ form a first modulating component array $510_A$. The second modulating components $510_{1B}$-$510_{8B}$ of modulating component sets $510_1$-$510_8$ form a second modulating component array $510_B$. The third modulating components $501_{1C}$-$510_{8C}$ of modulating component sets $510_1$-$510_8$ form a third modulating component array $510_C$. Although depicted as comprising eight modulating component sets, spatial light modulator 500 may include more or fewer modulating component sets.

As depicted in FIG. 5, modulating component sets $510_1$-$510_8$ include modulating components $510_{1A}$-$510_{1C}$, $510_{2A}$-$510_{2C}$, $510_{3A}$-$510_{3C}$, $510_{4A}$-$510_{4C}$, $510_{5A}$-$510_{5C}$, $510_{6A}$-$510_{6C}$, $510_{7A}$-$510_{7C}$, and $510_{8A}$-$510_{8C}$, respectively. The first, second, and third modulating components $510_{XA}$, $510_{XB}$, and $510_{XC}$ of each modulating component set 510 are adjacent in a direction normal to the dispersion direction a spatially dispersed optical signal (illustratively, normal to the dispersion direction of spatially dispersed optical signal 520). As depicted in FIG. 5, first, second, and third modulating component arrays $510_A$, $510_B$, and $510_C$ are one-dimensional arrays. Although depicted and described as one-dimensional arrays, in one embodiment, modulating component arrays $510_A$, $510_B$, and $510_C$ may be implemented as multi-dimensional modulating component arrays.

As depicted in FIG. 5, a spatially dispersed optical signal 520 is incident upon spatial light modulator 500 such that the dispersed optical spectrum is incident upon modulating component pairs 510. As depicted in FIG. 5, modulating components 510 are adapted such that an optical power associated with spatially dispersed optical signal 520 is distributed substantially equally across modulating components 510. Since optical power varies across the spatially dispersed optical signal (i.e., the optical power is greater near the center of spatially dispersed optical signal 520), the modulating components 510 in second modulating component array $510_B$ (disposed at the center of the spatially dispersed optical signal) are smaller than the modulating components 510 in modulating component arrays $510_A$ and $510_C$ (disposed at the ends of the spatially dispersed optical signal).

As depicted in FIG. 5, a single-frequency optical signal 530 of spatially dispersed optical signal 520 is incident upon spatial light modulator 500 such that the single-frequency optical signal 530 is incident upon one of the modulating component sets $510_1$-$510_8$ (illustratively, modulating component set $510_4$). Although one single-frequency optical signal 530 of spatially dispersed optical signal 520 is depicted, various other single-frequency optical signals (not depicted) of spatially dispersed optical signal 520 may be incident on others of the modulating component sets $510_1$-$510_8$.

The modulation of spectral phase and spectral amplitude of each of the single-frequency optical signals 530 is performed substantially as described herein with respect to FIG. 4, and, as such, is not repeated in detail with respect to FIG. 5. Specifically, each modulating component in each modulating component set is controllably moveable for performing one or both of phase and amplitude modulation. In particular, the modulating components of each modulating component set are adjustable (e.g., the respective phase settings of the first, second, and third modulating components are adjustable) for modulating phase and amplitude of a single-frequency component of an incident optical signal. In one embodiment, modulating components of a modulating component pair are moved using a piston motion in a direction normal to the planes of the modulating components (i.e., toward or away from the incident optical signal).

Figure 6:
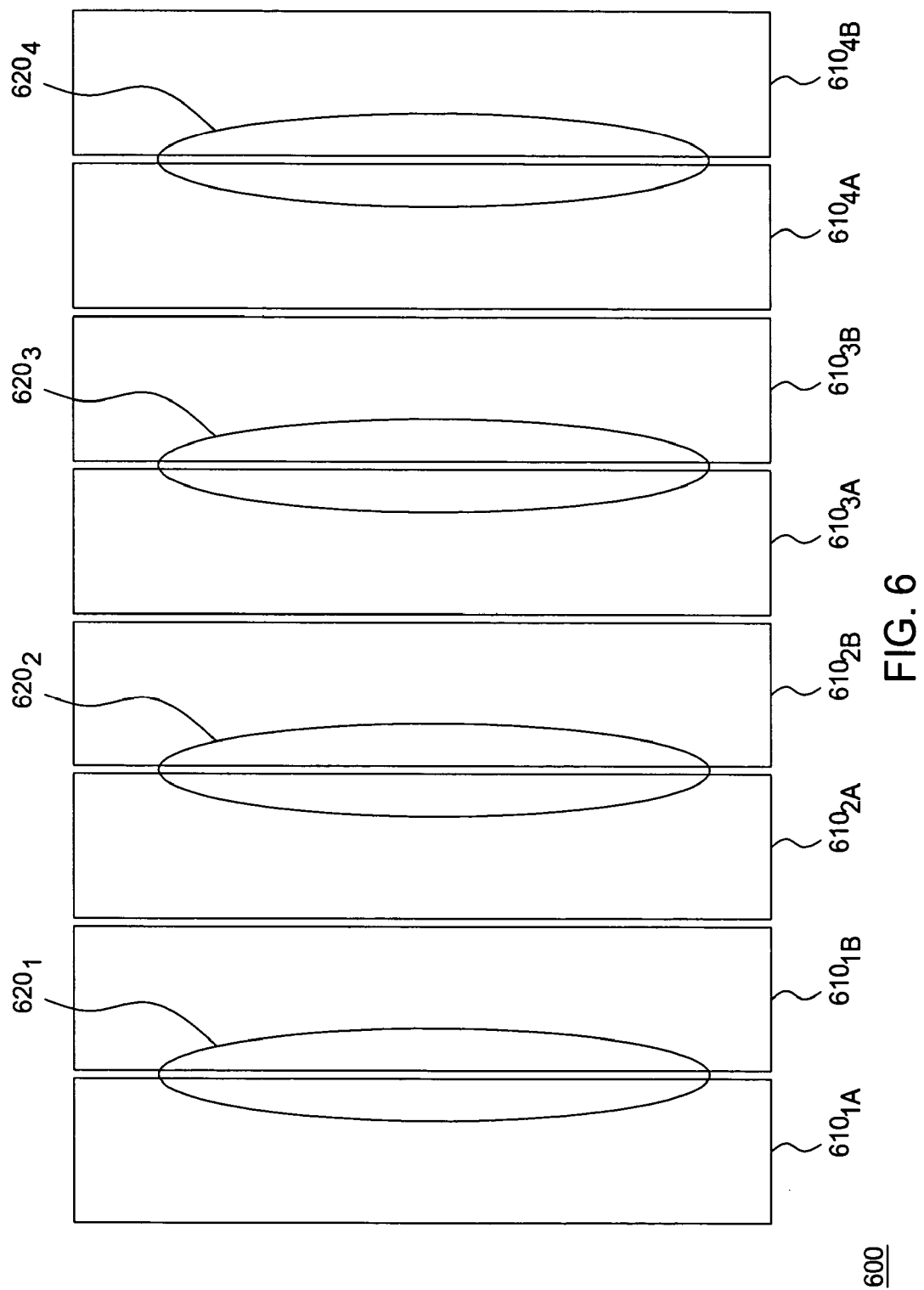
FIG. 6 depicts an incident view of a plurality of modulating component pairs of a spatial light modulator according to one embodiment of the invention.

FIG. 6 depicts an incident view of a plurality of modulating component pairs of a spatial light modulator according to one embodiment of the invention. Specifically, spatial light modulator 600 of FIG. 6 comprises a plurality of modulating component pairs $610_1$-$610_4$ (collectively, modulating component pairs 610). As depicted in FIG. 6, modulating component pairs $610_1$-$610_4$ include modulating components $610_{1A}$ and $610_{1B}$, $610_{2A}$ and $610_{2B}$, $610_{3A}$ and $610_{3B}$, and $610_{4A}$ and $610_{4B}$, respectively. The first modulating components $610_{1A}$-$610_{4A}$ and second modulating components $610_{1B}$-$610_{4B}$ of modulating component pairs $610_1$-$610_4$ are denoted as first modulating components $610_A$ and second modulating components $610_B$, respectively. Although depicted as comprising four modulating component pairs, spatial light modulator 600 may include fewer or more modulating component pairs.

As depicted in FIG. 6, the first modulating component $610_{XA}$ and second modulating component $610_{XB}$ of each modulating component pair 610 is adjacent in the dispersion direction of a spatial dispersed optical signal incident on spatial light modulator 600. As such, modulating component pairs 610 form a single modulating component array such that the first modulating components and second modulating components alternate along the direction of dispersion of the optical signal incident on spatial light modulator 600. As depicted in FIG. 6, a plurality of single-frequency optical signals $620_1$-$620_4$ (collectively, single-frequency optical signals 620) is incident upon modulating component pairs $610_1$-$610_4$, respectively. In one embodiment, single-frequency optical signals 620 are produced using a mode-locked laser.

The modulation of spectral phase and spectral amplitude of each of the single-frequency optical signals 630 is performed substantially as described herein with respect to FIG. 4, and, as such, is not repeated in detail with respect to FIG. 6. Specifically, each modulating component pair is controllably moveable for performing one or both of phase and amplitude modulation. In particular, the first and second modulating components of each modulating component pair are adjustable (i.e., the respective phase settings of the first and second modulating components are adjustable) for modulating phase and amplitude of a single-frequency component of an incident optical signal. In one embodiment, modulating components of a modulating component pair are moved using a piston motion in a direction normal to the planes of the modulating components (i.e., toward or away from the incident optical signal).

Figure 7:
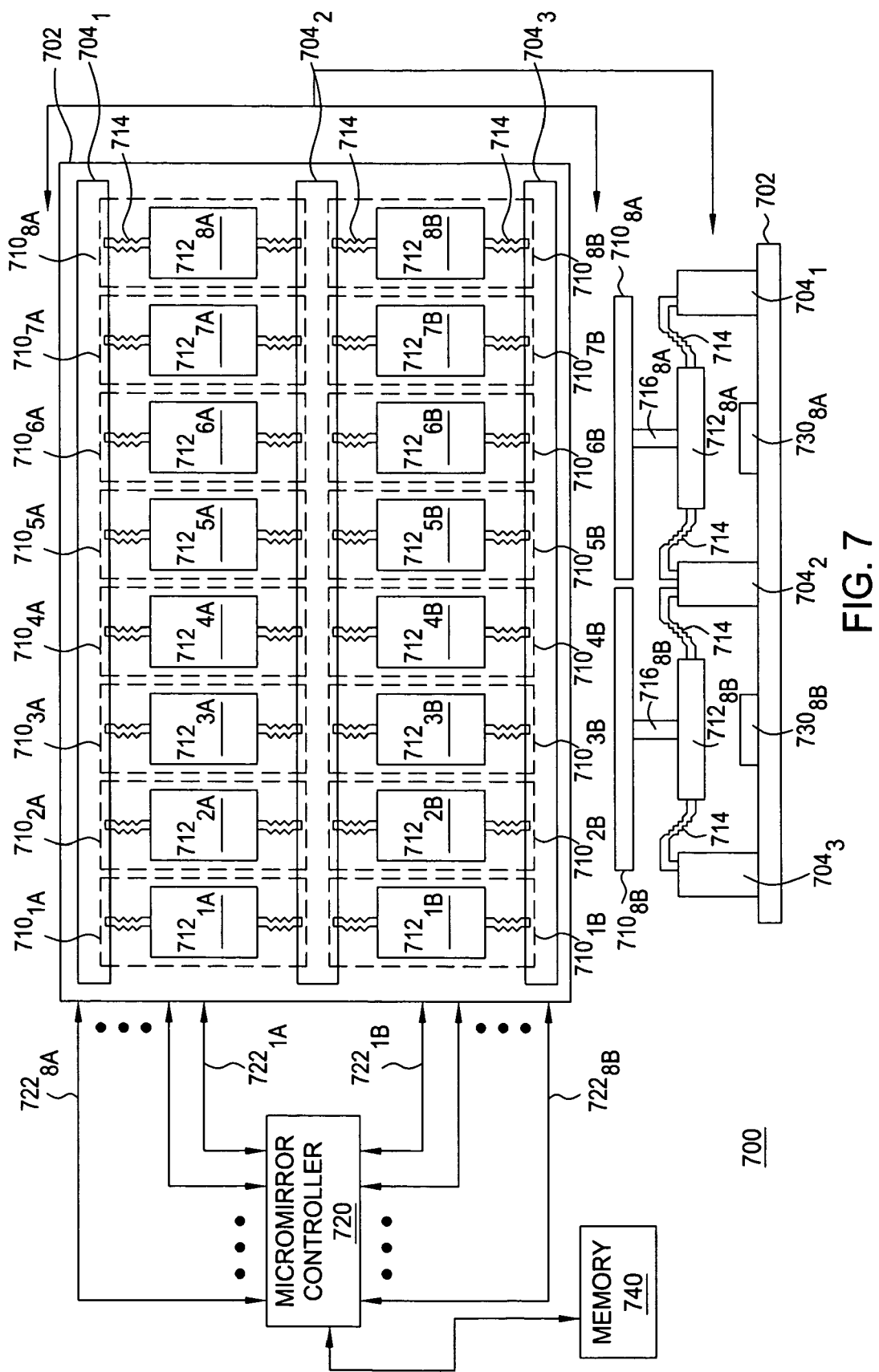
FIG. 7 depicts an incident view and a cross-sectional view of a spatial light modulator according to one embodiment of the invention.

FIG. 7 depicts a spatial light modulator according to one embodiment of there invention. Although primarily depicted and described herein with respect to using an electrode-activated, suspension-spring micromirror movement control mechanism, various other micromirror movement control mechanisms may be used in accordance with the present invention. As depicted in FIG. 7, spatial light modulator 700 is depicted using a top view (i.e., from the perspective of spatially dispersed optical signals incident on micromirrors in micromirror arrays) and a cross-sectional view (i.e., for showing the mechanical operation of the piston motion of the micromirrors in a micromirror array).

As depicted in FIG. 7, spatial light modulator 700 of FIG. 7 includes a substrate 702, a plurality of micromirror suspension means 704$_1$-704$_3$ (collectively, micromirror suspension means 704), a plurality of micromirrors 710$_{1A}$-710$_{8A}$ and 710$_{1B}$-710$_{8B}$, a plurality of micromirror supports 712$_{1A}$-712$_{8A}$ and 712$_{1B}$-712$_{8B}$, a micromirror controller 720, and a memory 740. As depicted in FIG. 2, micromirrors 710$_{1A}$-710$_{8A}$ and 710$_{1B}$-710$_{8B}$ are depicted using a dotted-line representation in order to depict the associated plurality of micromirror supports 712$_{1A}$-712$_{8A}$ and 712$_{1B}$-712$_{8B}$.

As depicted in FIG. 7, micromirrors 710$_{1A}$-710$_{8A}$ (denoted as micromirrors 710$_A$) form a first micromirror array, and micromirrors 710$_{1B}$-710$_{8B}$ (denoted as micromirrors 710$_B$) form a second micromirror array. The micromirrors 710$_A$ and micromirrors 710$_B$ are collectively denoted as micromirrors 710. Similarly, micromirror supports 712$_{1A}$-712$_{8A}$ (denoted as micromirror supports 712$_A$) form a first micromirror support array, and micromirrors 712$_{1B}$-712$_{8B}$ (denoted as micromirror supports 712$_B$) form a second micromirror support array. The micromirror supports 712$_A$ and micromirror supports 712$_B$ are collectively denoted as micromirror supports 712.

As depicted in FIG. 7, micromirrors 710$_{1A}$-710$_{8A}$ in first micromirror array 710$_A$ are coupled to micromirror supports 712$_{1A}$-712$_{8A}$ in first micromirror support array 712$_A$ using a respective plurality of support means 716$_{1A}$-716$_{8A}$. Similarly, micromirrors 710$_{1B}$-710$_{8B}$ in second micromirror array 710$_B$ are coupled to micromirror supports 712$_{1B}$-712$_{8B}$ in second micromirror support array 712$_B$ using a respective plurality of support means 716$_{1B}$-716$_{8B}$. As such, the micromirrors 710$_{1A}$-710$_{8A}$ in first micromirror array 710$_A$ and the micromirrors 710$_{1B}$-710$_{8B}$ in second micromirror array 710$_B$ are suspended above substrate 702.

As depicted in FIG. 7, micromirror supports 712$_{1A}$-712$_{8A}$ in first micromirror support array 712$_A$ are coupled to suspension means 704$_1$ and 704$_2$ using respective pluralities of spring means 714. Similarly, micromirror supports 712$_{1B}$-712$_{8B}$ in second micromirror support array 712$_B$ are coupled to suspension means 704$_2$ and 704$_3$ using respective pluralities of spring means 714. As depicted in FIG. 7, suspension means 704 are coupled to substrate 702. As such, micromirror supports 712$_{1A}$-712$_{8A}$ in first micromirror support array 712$_A$ and micromirror supports 712$_{1B}$-712$_{8B}$ in second micromirror array 712$_B$ are suspended above substrate 702. In one embodiment, each spring means 714 is coupled to a micromirror support 712 on a side surface of the micromirror support 712.

As depicted in FIG. 7, a combination of suspension means 704, spring means 712, micromirror supports 712, and micromirror support means 716 enables micromirrors 710 to move, using a piston motion, in a direction perpendicular to the surface of the micromirrors 710. As depicted in FIG. 7, micromirror motion is controlled by micromirror controller 720. In one embodiment, micromirror controller 720 is adapted for controlling micromirror movement in a direction perpendicular to the surface of micromirrors 710. In one further embodiment, micromirror controller 720 is adapted for controlling various other micromirror movements.

As depicted in FIG. 7, a first micromirror actuator array (e.g., an array of electrodes) and a second micromirror actuator array (e.g., an array of electrodes) associated with first micromirror array 710$_A$ and second micromirror array 710$_B$, respectively, are coupled to micromirror controller 720. The micromirror controller 720 provides signals to the first and second micromirror actuator arrays for individually controlling movement of each micromirror 710$_{1A}$-710$_{8A}$ and each micromirror 710$_{1B}$-710$_{8B}$, respectively. The micromirror controller 720 is adapted for controlling micromirror movement (i.e., micromirror position adjustment) for performing phase modulation and amplitude modulation in accordance with the present invention using at least one of a plurality of micromirror motion control schemes. As such, micromirror controller 720 is adapted for individually controlling movement of each micromirror 710.

As depicted in FIG. 7, micromirror controller 720 controls micromirror motion by applying varying voltages to respective electrodes associated with micromirrors 710. Although not fully depicted, each of the micromirrors 710 is coupled to an associated micromirror support 712 that is suspended over an associated electrode coupled to substrate 702 below the respective micromirrors 710. For example, as depicted in FIG. 7 (cross-sectional view) micromirrors 710$_{8A}$ and 710$_{8B}$ are coupled to micromirror supports 712$_{8A}$ and 712$_{8B}$ using associated support means 716$_{8A}$ and 716$_{8B}$ such that micromirror supports 712$_{8A}$ and 712$_{8B}$ are suspended over electrodes 630$_{8A}$ and 630$_{8B}$, respectively. As such, micromirror controller 720 controls micromirrors 710 using voltages applied to respective electrodes positioned below each of the micromirrors 710.

As depicted in FIG. 7, micromirror controller 720 is coupled to the plurality of electrodes associated with the plurality of micromirrors 710$_{1A}$-710$_{8A}$ in first micromirror array 710$_A$ using a respective plurality of voltage leads 722$_{1A}$-722$_{8A}$ (collectively, voltage leads 722$_A$). Similarly, micromirror controller 720 is coupled to the plurality of electrodes associated with the plurality of micromirrors 710$_{1B}$-710$_{8B}$ in second micromirror array 710$_B$ using a respective plurality of voltage leads 722$_{1B}$-722$_{8B}$ (collectively, voltage leads 722$_B$). The micromirror controller 720 controls micromirror movement (i.e., micromirror position adjustment) for performing phase modulation and amplitude modulation in accordance with the present invention.

As described herein, a combination of suspension means 704, spring means 714, micromirror supports 712, support means 716, and electrodes 730 enables adjustment of micromirror positions in a direction normal to the surface of micromirrors 710. The position of a micromirror may be adjusted such that the associated micromirror is attracted towards the substrate (i.e., moved away from an incident optical signal) or released away from the substrate (i.e., moved towards an incident optical signal)). In one embodiment, micromirrors 710 may be moved by adjusting voltages applied to underlying electrode 730. In one such embodiment, application of a constant voltage to an electrode maintains the associated micromirror at a constant position such that adjustment of the voltage applied to the electrode effects a desired movement of the micromirror towards or away from an incident optical signal.

In one embodiment, an increase in voltage difference between a micromirror support and an electrode increases the attraction of the micromirror support (and, therefore, the associated micromirror) towards the substrate (against the restorative force of the spring means pulling the micromirror in the opposite direction, i.e., towards an incident optical signal). In one embodiment, a decrease in voltage difference between a micromirror support and an electrode decreases the attraction of the micromirror support (and, therefore, the associated micromirror) towards the substrate (enabling the restorative force of the spring means to pull the micromirror away from the substrate, i.e., towards the incident optical signal). In one embodiment, the range of motion over which each micromirror may move is configured for modulating the phase of an optical signal in the range $[0,2\pi]$).

As described herein, micromirror controller 720 applies voltage to the electrodes for controlling micromirror movement for adjusting the micromirror positions. In one embodiment, a voltage difference between the micromirror support and the electrode determines the extent of the micromirror movement and, therefore, the extent of phase modulation (e.g., voltage difference =0V for modulation; voltage difference=-15V for $\pi/2$ modulation; voltage difference=-30V for $\pi$ modulation; voltage difference=-45V for $3\pi/2$ modulation; voltage difference=-60V for $2\pi$ modulation; voltage difference=-80V for snapdown). As such, the micromirror piston-motion movement range exceeds a $2\pi$ phase modulation before snapdown (i.e., the micromirror snaps down in a position such that the micromirror is coupled to the underlying electrode) occurs.

As described herein, spatially dispersed optical signals are incident on the reflective surfaces of the micromirrors. As the spatially dispersed optical signals strike the micromirrors, the spatially dispersed optical signals are reflected. The distance that the optical signals travel to reach the reflective surfaces of the micromirrors is dictated by the respective positions of the micromirrors (e.g., from phase=0 at voltage $V_0$ to phase=$2\pi$ at voltage $V_{2\pi}$, as well as various settings in between). Furthermore, the distance that the optical signals travel to reach the reflective surface of the micromirrors determines the phase of the optical signals. As such, adjustment of micromirror positions using piston-motion (where the piston motion moves the reflective surfaces of the micromirrors towards and away from the optical signal) enables various combinations of phase modulation.

As depicted in FIG. 7, various combinations of phase and amplitude modulation are effected using modulating component pairs (i.e., micromirror pairs). A modulating component pair includes a first modulating component and a second modulating component. The first modulating component and second modulating component of each modulating component pair are adjacent. For example, micromirrors $710_{1A}$-$710_{8A}$ and micromirrors $710_{1B}$-$710_{8B}$ form respective modulating component pairs (i.e., micromirrors $710_{1A}$ and $710_{1B}$ form a first micromirror pair, and so on). The configuration (i.e., adjacency) of the first modulating component and second modulating component varies across different embodiments of spatial light modulators in accordance with the present invention (as depicted and described with respect to FIG. 4, FIG. 5, and FIG. 6).

In one embodiment, each modulating component pair is controlled using an associated electrode pair. An electrode pair includes a first electrode and a second electrode, where the first electrode in an electrode pair controls a first modulating component in the modulating component pair and the second electrode in an electrode pair controls a second modulating component in the modulating component pair. A modulating component is actuated by voltage supplied, from a voltage source, to the electrode associated with the modulating component. The application of voltage to an electrode for adjusting the position of the modulating component is controlled by an associated modulating component controller (illustratively, micromirror controller 720).

As described herein, a first modulating component has an associated first phase setting (denoted as $\phi_1$) and a second modulating component has an associated second phase setting (denoted as $\phi_2$). The phase settings associated with the modulating components in a modulating component pair are established using piston-motion modulating component adjustments (illustratively, by micromirror controller 620). Table 1 shows target spectral phase and spectral amplitude settings, as well as the first and second phase settings associated with first and second modulating components, respectively, required for adapting an optical signal to obtain the target phase and amplitude settings.

TABLE 1

| $\phi_1$ | $\phi_2$ | PHASE | AMPLITUDE |
|---|---|---|---|
| 0 | 0 | 0 | 1 |
| $\pi$ | $\pi$ | $\pi$ | 1 |
| $4\pi/3$ | $2\pi/3$ | $\pi$ | 0.5 |
| $11\pi/6$ | $7\pi/6$ | $3\pi/2$ | 0.5 |
| $(3\pi/2) + \epsilon$ | $\pi/2$ | 0 | 0.001 |
| $(3\pi/2) - \epsilon$ | $\pi/2$ | $\pi$ | 0.001 |
| $\pi + \epsilon$ | 0 | $3\pi/2$ | 0.001 |

As described herein, spectral phase (denoted as PHASE in Table 1) is set according to a phase average between the first and second modulating components. For example, modulation of phase such that PHASE=$3\pi/2$ is achieved by actuating first and second modulating components such that $\phi_1$=$11\pi/6$ and $\phi_2$=$7\pi/6$, respectively. As described herein, spectral amplitude (denoted as AMPLITUDE in Table 1) is set according to a phase difference between the first and second modulating components. For example, modulation of amplitude such that AMPLITUDE=1 may be achieved by actuating first and second modulating components such that $\phi_1$=$\pi$ and $\phi_2$=$\pi$, respectively (i.e., phase difference is 0, corresponding to an AMPLITUDE=1). In order to continuously set any spectral phase within $[0,2\pi]$ and any spectral amplitude within $[0,1]$, first and second modulating components of each modulating component pair are each adapted for modulating phase within $[0,2\pi]$.

Upon independent modulation of a frequency component of a spatially dispersed optical signal by the first and second modulating components, and coupling of the modulated optical signal into a single mode fiber, the modulated frequency component couples with a field component. In one embodiment, the field component is represented as $[\exp(j\phi_1)+\exp(j\phi_2)]/2$, which simplifies to $[\exp[(\phi_1+\phi_2)/2]*\cos[(\phi_1-\phi_2)/2]$. As such, the phase average between the first and second modulating components sets the spectral phase (with a $\pi$ phase shift contribution from the cosine term if the cosine term goes negative). The modulation of phase near small amplitudes is sensitive to phase errors since the phase difference between the first and second modulating components of a modulating component pair is nearly equal to $\pi$.

In one embodiment, Table 1 is accessed by a controller (illustratively, micromirror controller 620) for setting first and second modulating components according to one of the pairs of first and second phase settings. In one embodiment, Table 1 is stored in a memory (illustratively, memory 640) for use by the controller in moving micromirrors to specific micromirror positions for modulating spectral phase and spectral amplitude of incident optical signals. In one such embodiment, the controller is adapted for actuating at least one of the first modulating component and the second modulating component for modulating one of: spectral phase only, spectral amplitude only, or both spectral phase and spectral amplitude.

Although various embodiments which incorporate the teachings of the present invention have been shown and described in detail herein, those skilled in the art can readily devise many other varied embodiments that still incorporate these teachings.

What is claimed is:

1. An apparatus for modulating spectral phase and spectral amplitude of a received optical signal, comprising:
   a spatial dispersion mechanism for spatially dispersing a received optical signal into a plurality of spatially dispersed signal components;
   a modulating mechanism comprising a plurality of modulating component sets, each modulating component set having associated adjacent modulating components operable for adapting relative phases of respective portions of one of the spatially dispersed signal components, the phase-adapted portions of the spatially dispersed signal component being adapted for modulating spectral phase of the spatially dispersed signal component; and
   a spatial filtering mechanism adapted for destructively interfering the phase-adapted portions of the spatially dispersed signal component for modulating spectral amplitude of the spatially dispersed signal component.

2. The apparatus of claim 1, further comprising:
   a spatial combination mechanism for spatially combining the phase-adapted portions of the spatially dispersed signal component for coupling the phase-adapted portions of the spatially dispersed signal component into the spatial filtering mechanism.

3. The apparatus of claim 1, further comprising:
   a controller coupled to the modulating mechanism, the controller adapted for controllably moving the associated adjacent modulating components.

4. The apparatus of claim 3, wherein controllably moving the associated adjacent modulating components comprises:
   controllably moving the associated adjacent modulating components for maintaining a constant separation between the associated adjacent modulating components for modulating thereby the phase of the spatially dispersed signal component; and
   controllably moving the associated adjacent modulating components for producing a varying separation between the associated adjacent modulating components for modulating thereby the amplitude of the spatially dispersed signal component.

5. The apparatus of claim 4, wherein the controller is adapted for:
   determining a plurality of first phase settings for the associated adjacent modulating components;
   determining a plurality of second phase settings for the associated adjacent modulating components; and
   adjusting the associated adjacent modulating components from the plurality of first phase settings to the respective plurality of second phase settings.

6. The apparatus of claim 5, further comprising:
   a modulating component adjustment mechanism coupled to the controller, the modulating component adjustment mechanism comprising a plurality of adjusting components associated with the associated adjacent modulating components;
   wherein the adjusting components are adapted for adjusting the associated adjacent modulating components from the plurality of first phase settings to the plurality of second phase settings.

7. The apparatus of claim 1, wherein the modulating mechanism is adapted such that an energy of the plurality of spatially dispersed signal components is distributed substantially equally across each of the plurality of modulating components.

8. The apparatus of claim 1, wherein the modulating components comprise micromirrors, the micromirrors being controllably moveable in a direction normal to respective planes of the micromirrors.

9. An apparatus, comprising:
   a spatial dispersion mechanism for spatially dispersing an optical signal into a plurality of frequency components;
   an array of optical reflector sets, each optical reflector set having a plurality of adjacent optical reflectors, wherein each optical reflector in each optical reflector set is normally disposed in a substantially co-planar manner with respect to one of the frequency components, and respective portions of the one frequency component are incident on respective adjacent optical reflectors of the optical reflector set, wherein each optical reflector in each optical reflector set is controllably moveable in a direction normal to its plane to adapt thereby a relative phase of each respective portion of the incident frequency component for modulating spectral phase of the incident frequency component; and
   a spatial filtering mechanism adapted for destructively interfering the phase-adapted portions of the incident frequency component for modulating the spectral amplitude of the incident frequency component.

10. The apparatus of claim 9, further comprising:
    a spatial combination mechanism for spatially combining the phase-adapted portions of the incident frequency component.

11. The apparatus of claim 9, wherein the spatial filtering mechanism comprises a single mode optical fiber.

12. The apparatus of claim 9, further comprising:
    a controller coupled to the array of optical reflector sets, the controller adapted for controllably moving the optical reflectors in each optical reflector set.

13. The apparatus of claim 12, wherein the controller is further adapted for:
    controllably moving the optical reflectors in each optical reflector set for maintaining a constant separation between the optical reflectors in each optical reflector set for modulating thereby the phase of the incident frequency component; and
    controllably moving the optical reflectors in each optical reflector set for producing a varying separation between the optical reflectors in each optical reflector set for modulating thereby the amplitude of the incident frequency component.

14. An apparatus for modulating one or both of spectral phase and spectral amplitude of a received optical signal, comprising:
    a spatial dispersion mechanism for spatially dispersing the received optical signal; and
    a modulating mechanism comprising a plurality of modulating component arrays having respective pluralities of modulating components, respective portions of the spatially dispersed optical signal being incident on associated ones of the modulating components; wherein the associated ones of the modulating components are adjacent in a direction normal to a dispersion direction of the spatially dispersed optical signal; and the associated ones of the modulating components are operable for adapting respective phases of the incident portions of the spatially dispersed optical signal, the phase-adapted portions of the spatially dispersed optical signal adaptable for modulating one or both of spectral phase and spectral amplitude of the received optical signal.

15. The apparatus of claim 14, further comprising:
a spatial filtering mechanism adapted for destructively interfering the phase-adapted portions of the spatially dispersed optical signal for modulating the spectral amplitude of the received optical signal.

16. The apparatus of claim 15, wherein the spatial filtering mechanism comprises a single mode optical fiber.

17. The apparatus of claim 14, further comprising:
a spatial combination mechanism for spatially combining the phase-adapted portions of the spatially dispersed optical signal for coupling the phase-adapted portions of the spatially dispersed optical signal into a spatial filtering mechanism.

18. The apparatus of claim 14, further comprising:
a controller coupled to the modulating mechanism, the controller adapted for controllably moving the associated ones of the modulating components.

19. The apparatus of claim 18, wherein controllably moving the associated ones of the modulating components comprises:
controllably moving the associated ones of the modulating components for maintaining a constant separation between the associated ones of the modulating components for modulating thereby the phase of the received optical signal; and
controllably moving the associated ones of the modulating components for producing a varying separation between the associated ones of the modulating components for modulating thereby the amplitude of the received optical signal.

* * * * *